United States Patent [19]

Ogawa et al.

[11] Patent Number: 5,383,126
[45] Date of Patent: * Jan. 17, 1995

[54] CONTROL SYSTEM FOR INTERNAL COMBUSTION ENGINES WITH EXHAUST GAS RECIRCULATION SYSTEMS

[75] Inventors: Ken Ogawa; Yoshihisa Hara; Kotaro Miyashita; Kei Machida, all of Wako, Japan

[73] Assignee: Honda Giken Kogyo Kabushiki Kaisha, Tokyo, Japan

[*] Notice: The portion of the term of this patent subsequent to Nov. 16, 2010 has been disclaimed.

[21] Appl. No.: 951,232

[22] Filed: Sep. 25, 1992

[30] Foreign Application Priority Data

Oct. 24, 1991 [JP] Japan ................. 3-305298
Oct. 24, 1991 [JP] Japan ................. 3-305299

[51] Int. Cl.$^6$ ............................................. F02D 41/08
[52] U.S. Cl. ............................ 364/431.06; 364/431.03; 364/431.05; 364/431.04; 123/339; 123/492; 123/571; 123/569; 123/493; 123/425
[58] Field of Search ................. 364/431.06, 431.05, 364/431.04, 431.03; 123/420, 436, 571, 493, 478, 492, 569, 480; 180/309

[56] References Cited

U.S. PATENT DOCUMENTS

| | | | |
|---|---|---|---|
| 4,318,386 | 3/1982 | Showalter et al. | 123/590 |
| 4,454,854 | 6/1984 | Gotoh et al. | 123/571 |
| 4,939,658 | 7/1990 | Sekozawa et al. | 364/431.06 |
| 4,947,820 | 8/1990 | Kushi | 123/571 |
| 4,957,083 | 9/1990 | Nakaniwa et al. | 123/436 |
| 5,031,401 | 7/1991 | Hinderks | 60/302 |
| 5,101,796 | 4/1992 | Matsumura et al. | 123/492 |
| 5,193,509 | 3/1993 | Ohmori et al. | 123/493 |

FOREIGN PATENT DOCUMENTS

| | | |
|---|---|---|
| 115862 | 8/1984 | European Pat. Off. . |
| 175478 | 3/1986 | European Pat. Off. . |
| 184626 | 6/1986 | European Pat. Off. . |
| 1203641 | 8/1989 | Japan . |

OTHER PUBLICATIONS

European Search Report (Dated Feb. 10, 1993).

Primary Examiner—Kevin J. Teska
Assistant Examiner—Jacques Harold Louis-Jacques
Attorney, Agent, or Firm—Lyon & Lyon

[57] ABSTRACT

A control system for an internal combustion engine estimates an amount of adherent fuel adhering to the inner surface of the intake passage, as well as an amount of carried-off fuel evaporated form fuel adhering to the inner surface of the intake passage and carried into combustion chambers, determines an amount of supply fuel to be supplied to the engine, based upon operating conditions of the engine, the estimated adherent fuel amount, and the estimated carried-off fuel amount, and supplies the determined supply fuel amount into the intake passage. The control system calculates an amount of exhaust gases to be recirculated from the exhaust passage to the intake passage, and corrects the estimated adherent fuel amount and the estimated carried-off fuel amount, based upon the calculated exhaust gas recirculating amount, based upon the calculated exhaust gas recirculating amount. Advantageously, the exhaust gas recirculating amount is calculated based upon dynamic characteristics of an exhaust gas recirculation control valve and those of exhaust gases being recirculated.

15 Claims, 14 Drawing Sheets

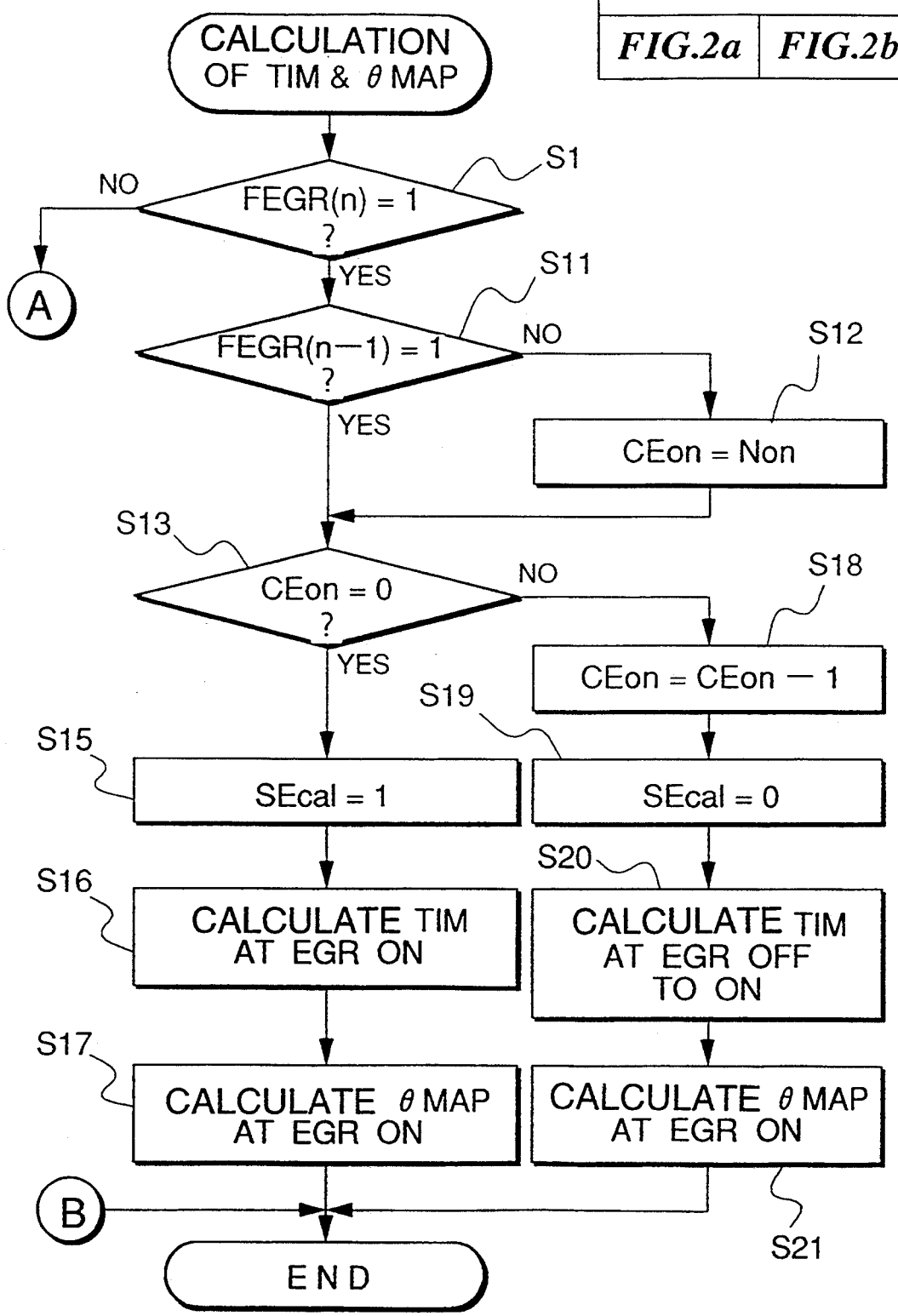

CONTROL SYSTEM FOR INTERNAL COMBUSTION ENGINES WITH EXHAUST GAS RECIRCULATION SYSTEMS

BACKGROUND OF THE INVENTION

1. Field of the Invention

This invention relates to a control system for internal combustion engines equipped with exhaust gas recirculation systems, and more particularly to a control system of this kind which controls engine control parameters by taking into consideration the influence of exhaust gas recirculation.

2. Prior Art

In internal combustion engines equipped with exhaust gas recirculation systems, it has been conventionally known to correct the supply fuel amount during operation of the exhaust gas recirculation system. Usually, an exhaust gas recirculation system has a recirculation control valve arranged across an exhaust gas recirculation passage. The control valve has a response time lag in being actuated by a control signal. In view of this response time lag, a control system of this kind has been proposed, which delays the timing of starting or terminating the correction of the supply fuel amount by a time period depending upon operating conditions of the engine, from the time the recirculation value is changed over from a closed position thereof to an open position or vice versa (Japanese Provisional Patent Publication (Kokai) No. 1-203641).

On the other hand, in conventional internal combustion engines of the type that fuel is injected into an intake pipe, there is a problem that some of injected fuel adheres to the inner surface of the intake pipe, so that a required amount of fuel cannot be drawn into the combustion chamber. To solve this problem, there has been proposed a fuel supply control method which estimates a fuel amount which is to adhere to the inner surface of the intake pipe and one which is to be drawn into the combustion chamber by evaporation from the fuel adhering to the intake pipe, and determines a fuel injection amount in dependence on the estimated fuel amounts (U.S. Pat. No. 4,939,658).

However, none of conventional internal combustion engines contemplate both the influence of the fuel adhering to the inner surface of the intake pipe and the influence of the exhaust gas recirculation upon the accuracy of control of the air-fuel ratio of a mixture supplied to the combustion chambers of the engines. This results in difficulties in accurately controlling the air-fuel ratio to a desired value.

Further, the above-mentioned proposed control system does not contemplate the time lag between the time the recirculation control valve is actually operated and the time the exhaust gas passing the valve actually reaches the combustion chamber, nor the influence of the recirculating gas temporarily staying in a bulk chamber provided in the recirculation passage. Therefore, there remains room for improvement in accurately controlling the air-fuel ratio of the mixture supplied to the combustion chamber and the ignition timing of the engine.

Particularly, the proposed control system does not contemplate the above-mentioned influence of the exhaust gas recirculation caused during a transient state of the engine such as at the start or termination of the exhaust gas recirculation, which results in degraded exhaust emission characteristics and driveability of the engine in such a transient state.

SUMMARY OF THE INVENTION

It is an object of the invention to provide a control system for an internal combustion engine equipped with an exhaust gas recirculation system, which is capable of properly controlling engine control parameters by taking into consideration the influence of the exhaust gas recirculation, to thereby improve exhaust emission characteristics and driveability of the engine.

It is a further object of the invention to provide a control system for an internal combustion engine equipped with an exhaust gas recirculation system, which is capable of accurately controlling the air-fuel ratio of a mixture supplied to combustion chambers of the engine by taking into consideration the influence of the exhaust gas recirculation, to thereby improve exhaust emission characteristics and driveability of the engine.

It is another object of the invention to provide a control system for an internal combustion engine equipped with an exhaust gas recirculation system, which is capable of properly controlling the air-fuel ratio of a mixture supplied to combustion chambers of the engine and the ignition timing of the engine during exhaust gas recirculation as well as during a transient state such as at the start or termination of the exhaust gas recirculation, to thereby improve exhaust emission characteristics and driveability of the engine.

According to a first aspect of the invention, there is provided a control system for an internal combustion engine having an intake passage having an inner surface, an exhaust passage, at least one combustion chamber, exhaust recirculation means having an exhaust gas recirculation control valve for controlling recirculation of exhaust gases from the exhaust passage to the intake passage, the control system including supply fuel amount calculating means for calculating an amount of supply fuel to be supplied to the engine, based upon operating conditions of the engine, adherent fuel amount estimating means for estimating an amount of adherent fuel adhering to the inner surface of the intake passage, carried-off fuel amount estimating means for estimating an amount of carried-off fuel evaporated from fuel adhering to the inner surface of the intake passage and carried into the combustion chamber, supply fuel amount correction means for correcting the supply fuel amount calculated by the supply fuel amount calculating means, in response to the adherent fuel amount estimated by the adherent fuel amount estimating means and the carried-off fuel amount estimated by the carried-off fuel amount estimating means, and fuel supply means for supplying the supply fuel amount corrected by the supply fuel amount correcting means into the intake passage, recirculation gas amount control means for controlling an amount of the exhaust gases to be recirculated from the exhaust passage to the intake passage, by controlling the exhaust gas recirculation control valve, based upon operating conditions of the engine.

The control system according to the first aspect is characterized by an improvement comprising:

recirculation gas amount calculating means for calculating the amount of the exhaust gases to be recirculated; and estimated fuel amount correcting means for correcting the adherent fuel amount and the carried-off fuel amount, based upon the amount of the exhaust gases calculated by the recirculation gas amount calculating means.

Preferably, the recirculation gas amount calculating means calculates the amount of the exhaust gases to be recirculated, based upon dynamic characteristics of the exhaust gas recirculation control valve and those of exhaust gases being recirculated, and rotational speed and load condition of the engine.

According to a second aspect of the invention, there is provided a control system for an internal combustion engine having an intake passage, an exhaust passage, at least one combustion chamber, and exhaust recirculation means having an exhaust gas recirculating passage extending between the exhaust passage and the intake passage, an exhaust gas recirculation control valve for controlling recirculation of the exhaust gases from the exhaust passage to the intake passage through the exhaust gas recirculation passage, the control system including fuel amount calculating means for calculating an amount of supply fuel to be supplied to the engine, based upon operating conditions of the engine, recirculation gas amount control means for controlling an amount of the exhaust gases to be recirculated from the exhaust passage to the intake passage, by controlling the exhaust gas recirculation control valve, based upon the operating conditions of the engine.

The control system according to the second aspect is characterized by an improvement comprising:

recirculation gas amount calculating means for calculating the amount of the exhaust gases to be recirculated, based upon dynamic characteristics of the exhaust gas recirculation control valve and those of exhaust gases being recirculated, and operating parameters of the engine; and fuel amount correcting means for correcting the supply fuel amount, based upon the amount of the exhaust gases calculated by the recirculation gas amount calculating means.

According to a third aspect of the invention, there is provided a control system for an internal combustion engine having an intake passage, an exhaust passage, at least one combustion chamber, exhaust recirculation means having an exhaust gas recirculation control valve for controlling recirculation of exhaust gases from the exhaust passage to the intake passage, the control system including recirculation gas amount control means for controlling an amount of the exhaust gases to be recirculated from the exhaust passage to the intake passage, by controlling the exhaust gas recirculation control valve, based upon operating conditions of the engine.

The control system according to the third aspect is characterized by an improvement wherein:

the recirculation gas amount control means controls a control amount by which the exhaust gas recirculation control valve is to be controlled, based upon dynamic characteristics of the exhaust gas recirculation control valve and those of exhaust gases being recirculated, and operating parameters of the engine.

According to a fourth aspect of the invention, there is provided a control system for an internal combustion engine having an intake passage, an exhaust passage, at least one combustion chamber, exhaust recirculation means having an exhaust gas recirculation control valve for controlling recirculation of exhaust gases from the exhaust passage to the intake passage, the control system including ignition timing calculating means for calculating ignition timing of the engine, based upon operating conditions of the engine, and recirculation gas amount control means for controlling an amount of the exhaust gases to be recirculated from the exhaust passage to the intake passage, by controlling the exhaust gas recirculation control valve, based upon the operating conditions of the engine.

The control system according to the fourth aspect is characterized by an improvement comprising:

recirculation gas amount calculating means for calculating the amount of the exhaust gases to be recirculated, based upon dynamic characteristics of the exhaust gas recirculation control valve and those of exhaust gases being recirculated, and operating parameters of the engine; and ignition timing correcting means for correcting the ignition timing, based upon the amount of the exhaust gases calculated by the recirculation gas amount calculating means.

In the control systems according to the second to fourth aspects, preferably, the dynamic characteristics of the exhaust gas recirculation control valve include a response time lag of the valve in opening/closing action thereof.

Also preferably, the dynamic characteristics of the exhaust gases being recirculated include a time period between the time the exhaust gases being recirculated pass the exhaust gas recirculation control valve and the time the gases reach the combustion chamber, and an amount of exhaust gases staying in a passageway including the exhaust gas recirculation passage and the intake passage at a zone between the exhaust gas recirculation control valve and the combustion chamber.

Preferably, the recirculation gas amount calculating means calculates the amount of the exhaust gases, based upon a ratio of an amount of exhaust gases drawn into the combustion chamber in a cycle to the whole amount of exhaust gases which has passed the exhaust recirculation gas control valve in the same cycle, and a ratio of an amount of exhaust gases staying in a portion of the exhaust gas recirculation passage and the intake passage at a zone between the exhaust gas recirculation control valve and the combustion chamber in a preceding cycle and drawn into the combustion chamber in a present cycle to the whole amount of exhaust gases which stayed in the portion of the exhaust gas recirculation passage and the intake passage in a preceding cycle.

Also preferably, the operating parameters of the engine comprises rotational speed and load conditions of the engine.

The above and other objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
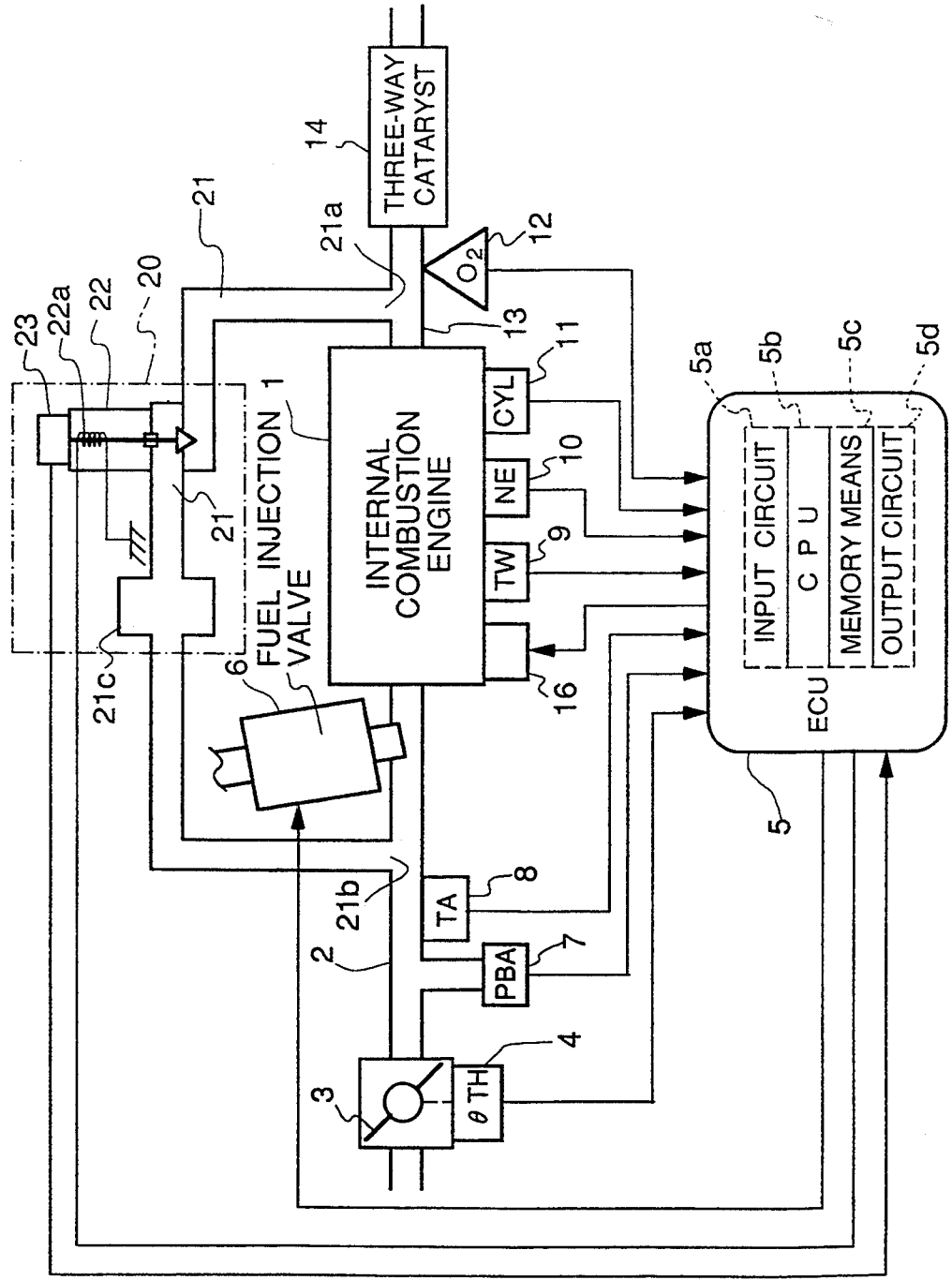
FIG. 1 is a block diagram showing the whole arrangement for an internal combustion engine and a control system therefor according to an embodiment of the invention.

Referring first to FIG. 1, there is shown the whole arrangement of an internal combustion engine (hereinafter referred to merely as "the engine") equipped with an exhaust gas recirculation system, and a control system therefor according to an embodiment of the invention. In the figure, reference numeral 1 designates the engine (e.g. four-cylinder type) for automotive vehicles. Connected to the cylinder block of the engine 1 is an intake pipe (intake passage) 2 in which is arranged a throttle valve 3. A throttle valve opening sensor (hereinafter referred to as "the $\theta$TH" sensor) 4 is connected to the throttle valve 3 for generating an electric signal indicative of the sensed throttle valve opening and supplying same to an electronic control unit (hereinafter referred to as "the ECU") 5.

Fuel injection valves 6, only one of which is shown, are inserted into the interior of the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

A spark plug 16 of each cylinder is electrically connected to the ECU 5 to have its ignition timing $\theta$IG controlled by a signal therefrom.

On the other hand, an intake pipe absolute pressure (PBA) sensor 7 is provided in communication with the interior of the intake pipe 2 at a location immediately downstream of the throttle valve 3 for supplying an electric signal indicative of the sensed absolute pressure within the intake pipe 2 to the ECU 5. An intake air temperature (TA) sensor 8 is mounted in the wall of the intake pipe 2 for supplying an electric signal indicative of the sensed intake air temperature to the ECU 5.

An engine coolant temperature (TW) sensor 9, which is formed of a thermistor or the like, is mounted in the cylinder block of the engine 1, for supplying an electric signal indicative of the sensed engine coolant temperature TW to the ECU 5. An engine rotational speed (NE) sensor 10 and a cylinder-discriminating (CYL) sensor 11 are arranged in facing relation to a camshaft or a crankshaft of the engine 1, not shown. The engine rotational speed sensor 10 generates a pulse as a TDC signal pulse at each of predetermined crank angles whenever the crankshaft rotates through 180 degrees, and the cylinder-discriminating sensor 11 generates a pulse at a predetermined crank angle of a particular cylinder, both the pulses being supplies to the ECU 5.

A catalytic converter (three-way catalyst) 14 is arranged in an exhaust pipe (exhaust passage) 13 connected to an exhaust port of the engine 1, for purifying noxious components such as HC (hydrocarbon), CO (carbon monoxide), and NOx (nitrogen oxides).

An oxygen concentration sensor (hereinafter referred to as "the O2 sensor") 12 is mounted in the exhaust pipe 13 at a location upstream of the catalystic converter 14, for sensing the concentration of oxygen present in exhaust gases emitted from the engine and supplying an electric signal indicative of the sensed oxygen concentration to the ECU 5.

In the figure, reference numeral 20 designates the exhaust gas recirculation system which is arranged as follows:

An exhaust gas recirculation passage 21 is communicated at an end 21a thereof with the exhaust pipe 13 at a location upstream of the three-way catalyst 14, and at the other end 21b thereof with the intake pipe 2 at a location downstream of the throttle valve 3. An exhaust gas recirculation valve (exhaust gas recirculation control valve) 22, which controls an amount of exhaust gas to be recirculated, and a bulk chamber 21C are arranged across the exhaust gas recirculation passage 21. The exhaust gas recirculation valve 22 is an electromagnetic valve having a solenoid 22a which is electrically connected to the ECU 5 such that the valve opening thereof is linearly changed in proportion to the current amount of a control signal from the ECU 5. A lift sensor 23 is connected to a valve body of the exhaust gas recirculation valve 22 for supplying a signal indicative of the sensed valve opening to the ECU 5.

The ECU 5 operates to determine operating conditions of the engine based upon engine operating parameter signals from the above-mentioned various sensors, etc. and supplies a control signal to the solenoid 22a of the exhaust gas recirculation valve 22 so as to make zero the difference between a valve opening command value LCMD for the exhaust gas recirculation valve 22 set in response to the intake passage absolute pressure PBA and the engine rotational speed NE and an actual valve opening value of the valve 22, which is detected by the lift sensor 23.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed in the CPU 5b, various maps and tables, etc., and a RAM for storing results of calculations therefrom, etc., and an output circuit 5d which outputs driving signals to the fuel injection valves 6, the spark plugs 16, and the exhaust gas recirculation valve 22.

The CPU 5b operates in response to the above-mentioned signals from the sensors to determine operating conditions in which the engine 1 is operating, such as an air-fuel ratio feedback control region and open-loop control regions, and calculates, based upon the determined operating conditions, a fuel injection period Tout over which the fuel injection valves 6 are to be operated, and the ignition timing $\theta$IG of the spark plugs 16, by the use of the following equations (1) and (2):

$$Tout = TIM \times K1 + K2 \quad (1)$$

$$\theta IG = \theta MAP \times \theta CR \quad (2)$$

where TIM represents a basic fuel amount, specifically, a basic fuel injection period which is determined by the engine rotational speed NE and the intake pipe absolute pressure PBA.

$\theta$MAP represents a basic fuel injection timing also determined by the engine rotational speed NE and the intake pipe absolute pressure PBA.

The TIM and $\theta$MAP values are set to values corresponding to the exhaust gas recirculation amount which is calculated not only based upon the NE and PBA values but also with dynamic characteristics of the exhaust gas recirculation valve 22 and those of the exhaust gases recirculated, as hereinafter described.

$\theta$CR in the equations (1), (2) generally represents correction coefficients and correction variables which are calculated in response to various engine operating parameters, to values appropriate to operating conditions of the engine so as to optimize various characteristics of the engine such as fuel consumption and accelerability.

Further, the CPU 5b controls the valve opening of the exhaust gas recirculation valve 22 of the above-mentioned exhaust gas recirculation system 20 in response to operating conditions of the engine.

The CPU 5b operates based upon the results of the above calculations to supply signals for driving the fuel injection valves 6, the spark plugs 16 and the exhaust gas recirculation valve 22 through the output circuit 5d.

Figure 2B:
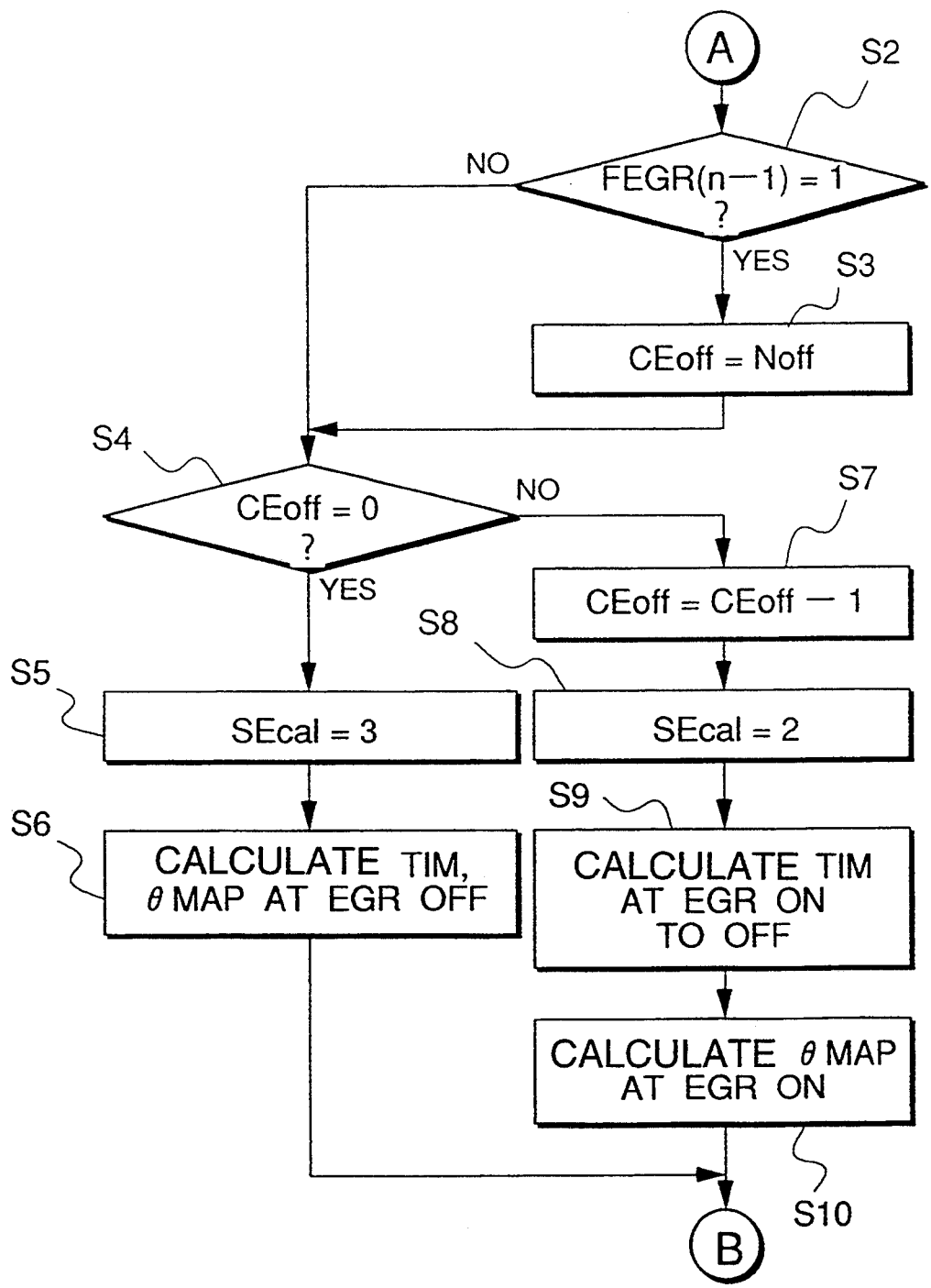
FIG. 2 (comprising of FIGS. 2(a) and 2(b)) are flowcharts of a program for calculating a basic fuel amount (TIM) and a basic ignition timing ($\theta$MAP) in response to opening and closing operation of an exhaust gas recirculation valve.

FIGS. 2(a) and 2(b) show programs for executing calculation of the basic fuel amount TIM and the basic ignition timing $\theta$MAP in response to opening and closing of the exhaust gas recirculation valve 22 (hereinafter referred to as "the EGR valve").

The basic fuel amount TIM and the basic fuel ignition timing $\theta$MAP are calculated in response to the engine rotational speed NE and the intake pipe absolute pressure value PBA, as mentioned before. Further, the calculation is made by the use of different maps selected depending upon whether the EGR valve is open or closed.

The program is executed in synchronism with generation of each TDC signal pulse. In the following description, the state in which the EGR valve 22 is open will be referred to as "EGR on", while the state in which the EGR valve is closed "EGR off".

At a step S1 in FIG. 2, it is determined whether or not a value of an EGR flag in the present loop IEGR(n), which flag is set to a value of 1 at EGR on, assumes the value of 1. Irrespective of the answer, it is determined at steps S2, S11 whether or not a value FEGR(n-1) of the EGR flag in the last loop assumes 1.

If the answer to the question of the step S1 is negative (NO) and at the same time the answer to the question of the step S2 is affirmative (YES) i.e., FEGR(N)=0 and FEGR(n-1)=1, an off counter CEoff, which counts the number of times of execution of the present program (the number of TDC signal pulses generated) after the EGR valve is changed from an on state to an off state, is set to a predetermined value Noff (e.g. 12) at a step S3, and then the program proceeds to a step S4.

If both of the answers to the questions of the steps S1 and S2 are negative i.e., FEGR(n)=FEGR(n-1) =0, the program jumps to the step S4, where it is determined whether or not the count value of the off counter CEoff is equal to 0. If the answer at the step S4 is negative (NO), i.e., CEoff>0, the count value of the off counter CEoff is decremented by 1 at a step S7, and then a mode status SEcal is set to a value of 2 at a step S8. The mode status SEcal is used at the next step S9 to discriminate the state of the EGR valve, i.e. an on state, an off state, a transient state where the EGR valve has been changed from the on state to the off state, or a transient state where the EGR valve has been changed from the off state to the on state.

The value of 2 means that the EGR valve is in the transient state where the EGR valve has been changed from the on state to the off state.

At the following steps S9, S10, the basic fuel amount TIM is calculated by programs in FIG. 3 and FIG. 4, described hereinafter, and the basic ignition timing $\theta$MAP by a program in FIG. 5, hereinafter described, followed by terminating the program.

If the answer to the question of the step S4 is affirmative (YES), that is, CEoff=0, which means that a predetermined number (Noff) of TDC signal pulses have been generated after the EGR valve was changed to the off state, it, therefore, is considered that the EGR valve is stably in the off state. Then, the mode status SEcal is set to a value of 3, at the step S5 which means that the EGR valve is in the off state. Then, the TIM value and the $\theta$MAP value to be applied when the EGR valve is in the off state, i.e. the ordinary TIM and $\theta$MAP values are calculated, at a step S6, followed by terminating the program.

If the answer to the question of the step S1 is affirmative (YES) and at the same time the answer to the question of the step S11 is negative (NO), i.e. FEGR(n)=1 and FEGR(n-1)=0, it is determined that the EGR valve is in the transient state where it has been changed from the off state to the on state, and then an on-counter CEon, which counts the number of times of execution of the program after the transition from the EGR off state to the EGR on state, is set to a predetermined value Non (e.g. 10), followed by the program proceeding to a step S13.

If both of the answers to the questions of the steps S1 and S11 are affirmative (YES), i.e. FEGR(n)-=FEGR(n-1)=1, the program directly proceeds to the step S13, where it is determined whether or not the on-counter CEon assumes 0. If the answer to the question of the step S13 is negative (NO), i.e. CEon>0, the count value of the on-counter CEon is decremented by 1 at a step S18, and the mode status SEcal is set to a value of 0 at a step S19. The value of 0 means that the EGR valve is in the transient state where it has been changed from the off state to the on state.

Figure 3:
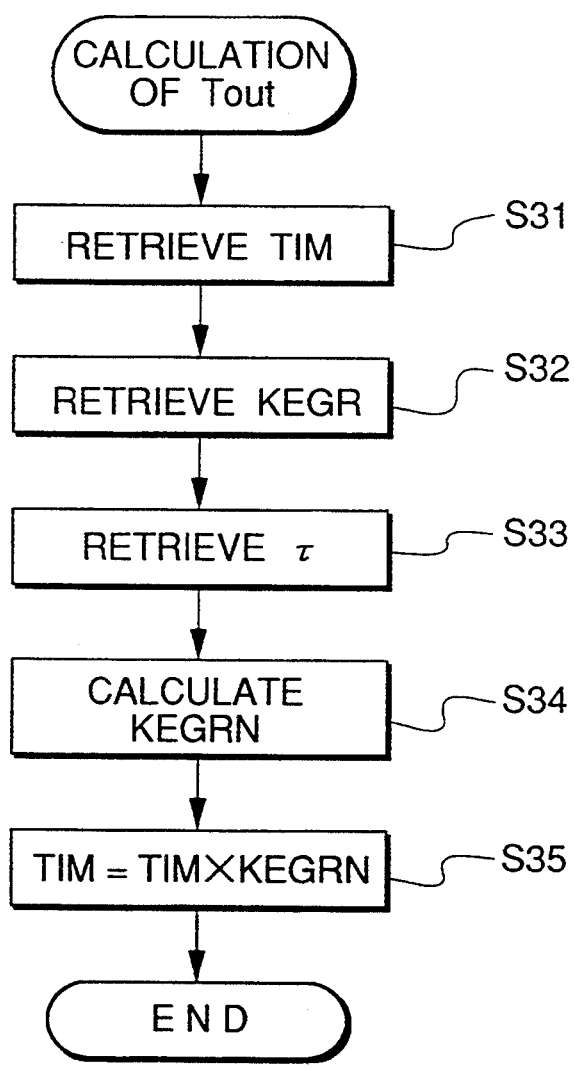
FIG. 3 is a flowchart of a program for carrying out calculation of the basic fuel amount, which is executed by the program of FIG. 2.
Figure 4:
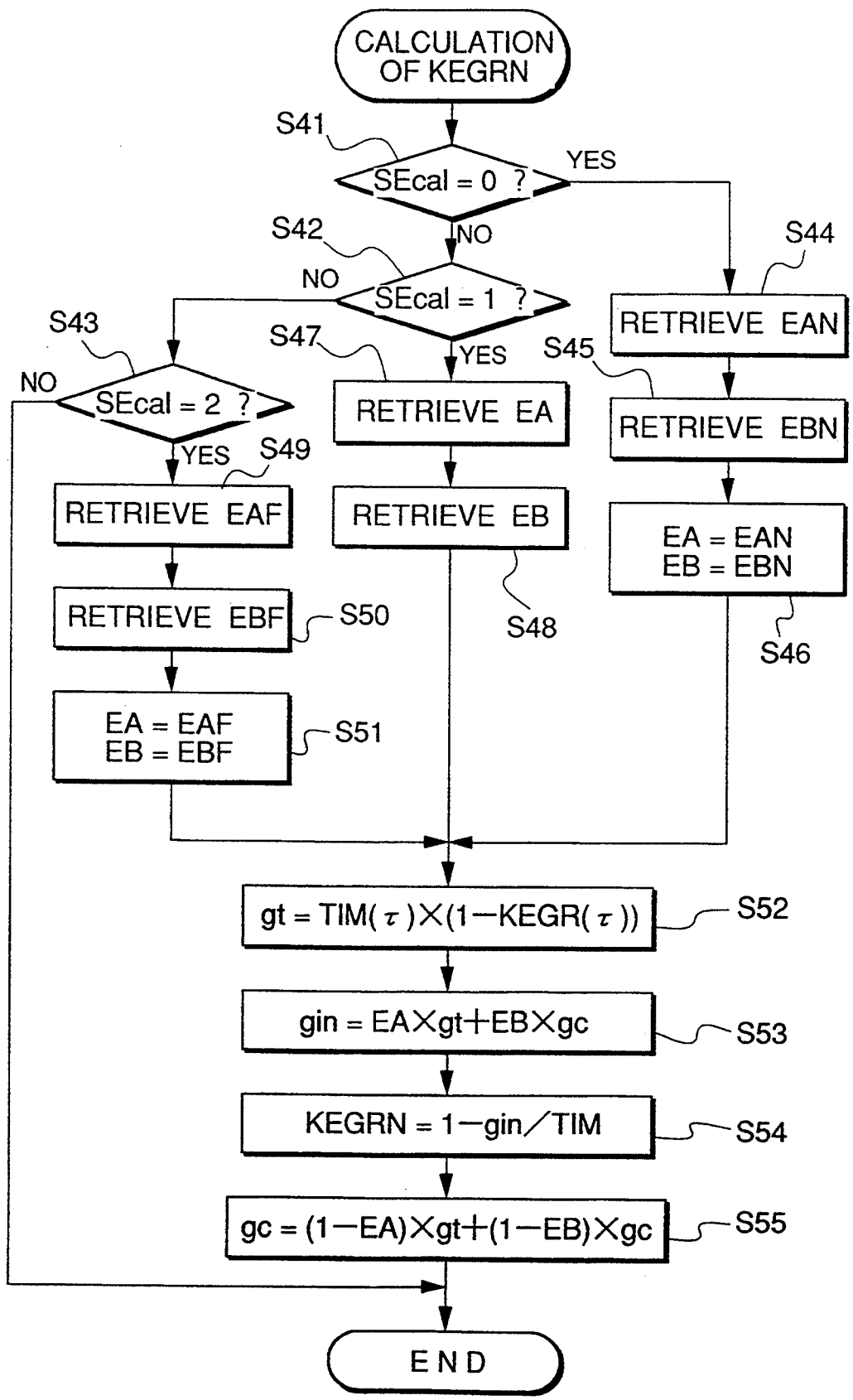
FIG. 4 is a flowchart of a program for carrying out calculation of a net EGR coefficient, which is executed by the program of FIG. 3.
Figure 5:
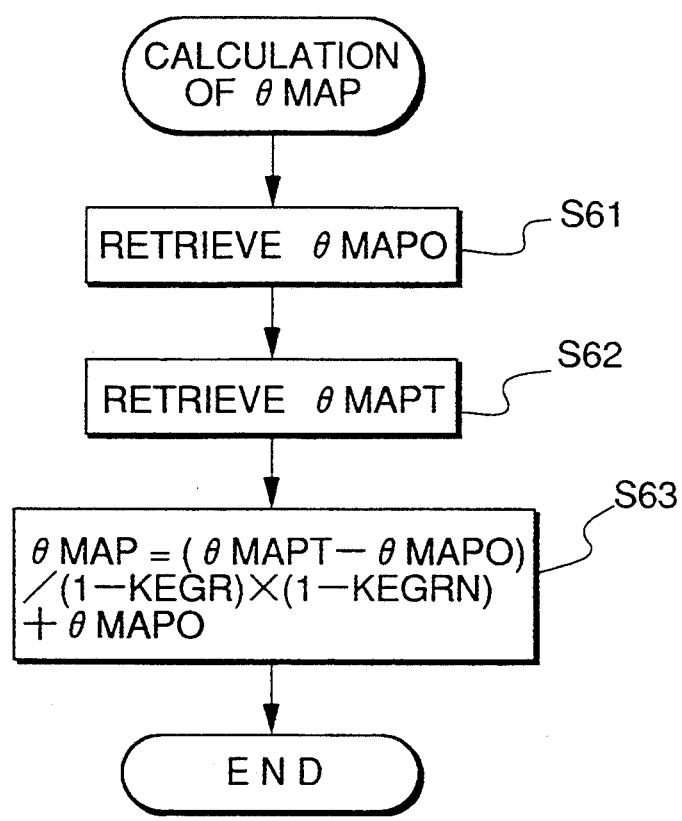
FIG. 5 is a flowchart of a program for calculating the basic ignition timing, which is executed by the program in FIG. 2.

At the following steps S20, S21, similar programs to the programs of FIG. 3 to FIG. 5 are executed as at the aforementioned steps S9 and S10, followed by terminating the program.

If the answer to the question of the step S13 is affirmative (YES), i.e. CEon=0, which means that the predetermined number (Non) of TDC signal pulses have been generated after the transition to the EGR on state, then, it is judged that the on state has become stable, and therefore the mode status SEcal is set to a value of 1 at a step S15. The value of 1 means that the EGR valve is in the on state.

At the following steps S16, S17, similar programs to the programs of FIG. 3 to FIG. 5 are executed as at the steps S9, S10, followed by terminating the program.

FIG. 3 shows the program for calculating the basic fuel amount TIM at the above-mentioned step S9 in FIG. 2. The programs executed at the steps S16 and S20 in FIG. 2 are substantially identical with the present program, and therefore description of which is omitted.

At steps S31 to S33, the basic fuel amount TIM, an EGR coefficient KEGR and a dead time $\tau$ are calculated based upon the engine rotational speed NE and the intake passage absolute pressure PBA. These parameters TIM, KEGR and $\tau$ are calculated by retrieving maps set in accordance with the NE value and the PBA value, and an interpolation is carried out, if required.

Figure 6:
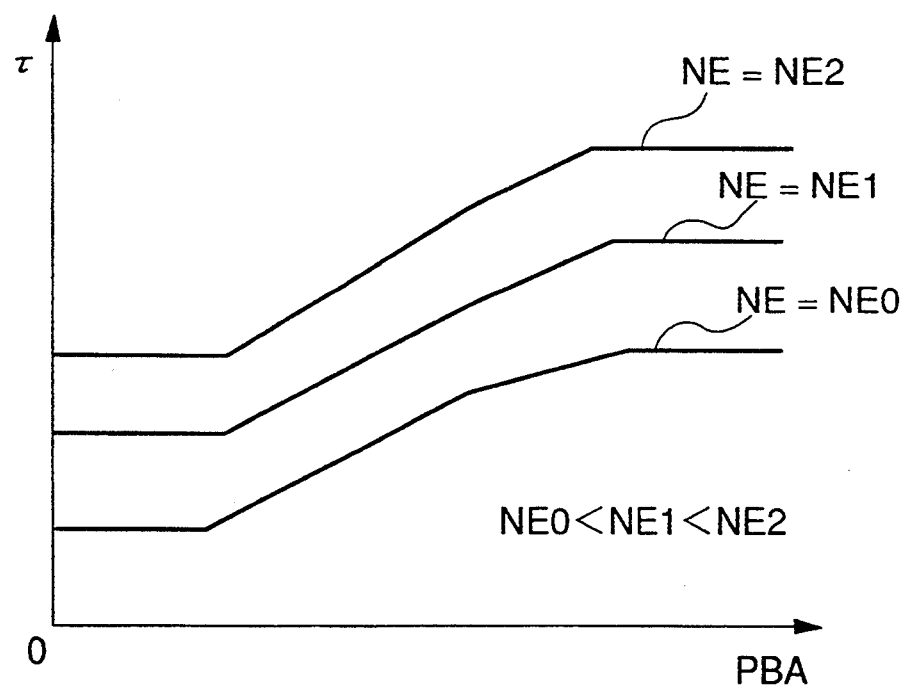
FIG. 6 shows a map for determination of a dead time ($\tau$) in exhaust gas recirculation.

The EGR coefficient KEGR is provided to correct the TIM value in the decreasing direction, in view of the fact that as an inactive gas is recirculated into the intake pipe 2 during EGR on, so that the intake air amount substantially decreases. (1−KEGR), hereinafter referred to, corresponds to the recirculation ratio EGRR/R. The dead time $\tau$ corresponds to a time period between the time the recirculation gas passes the EGR valve 22 and the time the gas reaches the combustion chamber. In the present embodiment, the dead time $\tau$ is expressed or counted in terms of the number of TDC pulses generated. The dead time $\tau$ is set to greater values as the PBA value or the NE value is longer or higher, for instance, as shown in FIG. 6.

At the following steps S34, S35, a net EGR coefficient KEGRN is calculated by the program of FIG. 4, and the TIM value is corrected by the calculated KEGRN value by the use of the following equation (3) at the step S35, followed by terminating the program:

$$TIM = TIM \times KEGRN \tag{3}$$

At steps S41 to S43 in FIG. 4, it is determined which value of 0, 1 or 2 the mode status SEcal assumes.

If the answer is negative (NO) at any of the steps S41 to S43, i.e. the SEcal value does not assume any value of 0, 1, or 2, this means that the SEcal=3, indicating that the EGR valve is in the off state. Therefore, the amount of EGR recirculation gas need not be calculated, and accordingly, the program is immediately terminated.

If the answer to the question of the step S41 is affirmative (YES), i.e. SEcal=0, this means that the EGR valve has just been shifted to the on state from the off state, and therefore an EGR direct supply ratio EAN and an EGR carry-off ratio EBN to be applied at the transition from EGR off to EGR on are calculated at steps S44–S46. If the answer to the question of the step S42 is affirmative (YES), i.e. SEcal=1, meaning that the EGR valve is open, an EGR direct supply ratio EA and an EGR carry-off ratio EB to be applied at REGR on are calculated at steps S47, S48. If the answer to the question of the step S43 is affirmative (YES), i.e. SEcal=2, meaning that the EGR valve has just been changed to the on state from the off state, an EGR direct supply ratio EAF and an EGR carry-off ratio EBF to be applied at the transition from EGR on to EGR off are calculated at steps S49 to S51, and then the program proceeds to a step S52.

The EGR direct supply ratio EA is defined as a ratio of an amount of recirculation gas directly or immediately drawn into the combustion chamber in a cycle to the whole amount of the gas which has passed the EGR valve 22 in the same cycle, and the EGR carry-off ratio EB is defined as a ratio of an amount of recirculation gas staying in a portion of the recirculation passage 21, hereinafter referred to, in the last or immediately preceding cycle and drawn into the combustion chamber in the present cycle to the whole amount of recirculation gas which stayed in the portion of the recirculation passage 21 including the intake pipe 2 from the EGR valve 22 to the combustion chamber (mainly in the bulk chamber 21c) in the last cycle or immediate preceding cycle. The EGR direct supply ratio EA and the EGR carry-off ratio EB are read, respectively, from an EA map and an EB map which are set in accordance with the engine rotational speed NE and the intake pipe absolute pressure PBA, in response to a value of engine rotational speed NE($\tau$) and a value of intake pipe absolute pressure PBA($\tau$) which were detected in a loop preceding the present loop by a number of TDC signal pulses corresponding to the dead time $\tau$ (hereinafter referred to as "$\tau$TDC"), at steps S47, S48. That is, "$\tau$" represents the dead time calculated at the step S33 in FIG. 3. The value of $\tau$ TDC is read in response to the value of $\tau$ from detected values corresponding, respectively, to, for instance, past 20 TDC pulses stored in the memory means 5C.

Figure 7A:
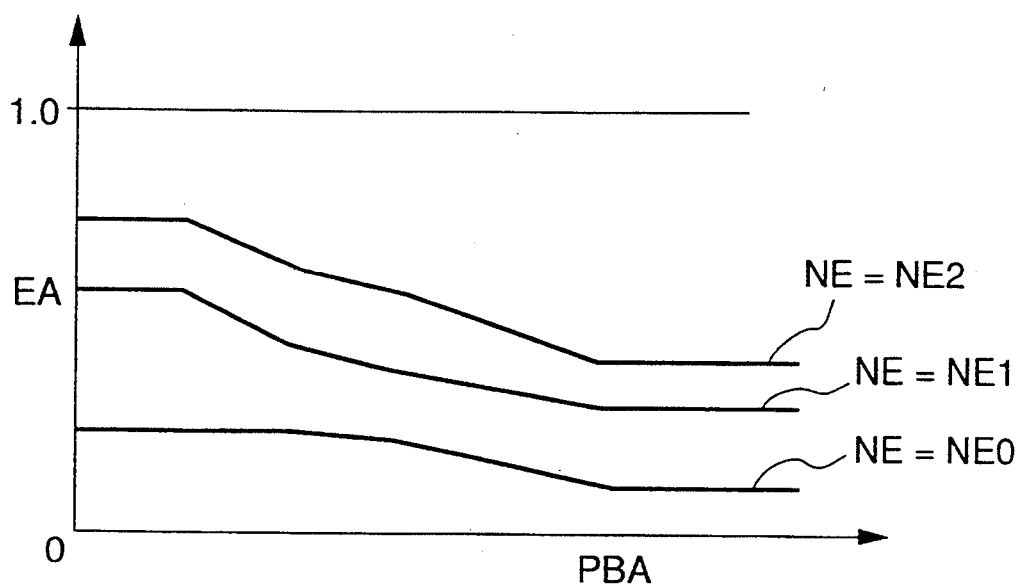
FIGS. 7(a) and (b) show tables for determining an EGR direct supply ratio (EA) and an EGR carry-off ratio (EB)
Figure 7B:
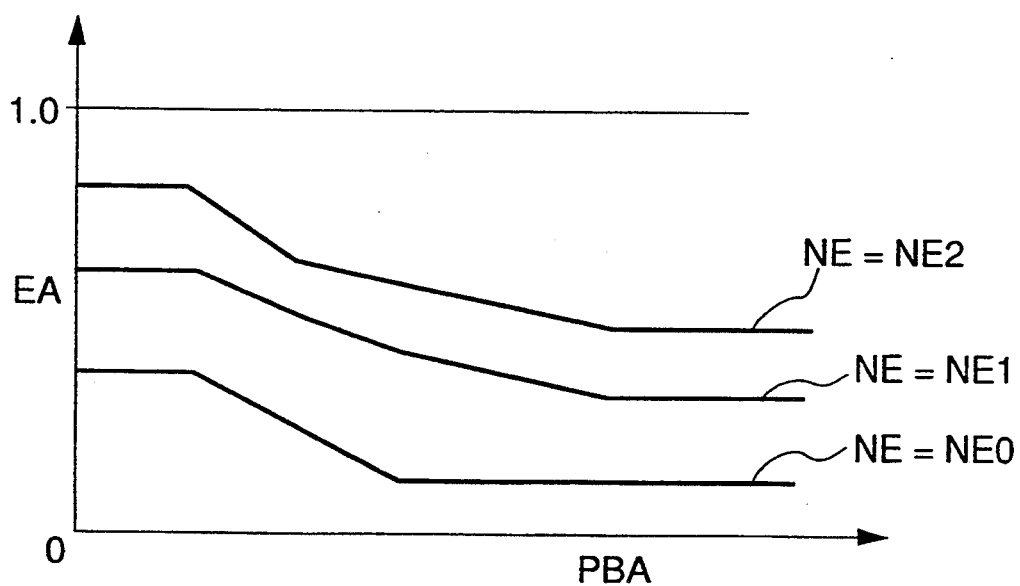

The EGR direct supply ratios EAN and EAF at the EGR off to an transition and at the EGR on to off transition are read, respectively, from an EAN map and an EAF map (whose formats are similar to those shown in FIG. 7) set in accordance with dynamic characteristics of the recirculation gas in respective transient states, in response to the NE($\tau$) and PBA($\tau$) values at steps S44, S49. The EGR carry-off ratios EBN, EBF at the EGR off to on transition and at the EGR on to off transition are similarly calculated at steps S45, S50. The map values of the EAN map, the EAF map, the EBN map and the EBF map are set to values which compensate for the response time lag of the EGR valve 22 (a time period between the time the ECU 5 outputs a control signal and the time the EGR valve is opened to a valve opening corresponding to the command value).

Then, at a step S52, a required recirculation gas amount (an amount of recirculation gas which passed the EGR valve) gt is calculated by the following equation (4):

$$gt = TIM(\tau) \times (1 - KEGR(\tau)) \tag{4}$$

where ($\tau$) indicates that the value concerned is a value calculated $\tau$TDC before.

At the next step S53, an actual recirculation gas amount gin, which is to be actually drawn into the combustion chamber, is calculated by the use of the following equation (5):

$$gin = EA \times gt + EB \times gc \tag{5}$$

where gc represents an amount of recirculation gas staying in the bulk chamber 21C, etc. after passing the EGR valve and calculated at a step S55, referred to hereinafter, in the execution of the present program in the last loop.

At the following step S54, the net EGR coefficient KEGRN is calculated by the use of the following equation (6):

$$KEGRN = 1 - gin/TIM \qquad (6)$$

At the step S55, the staying gas amount gc is calculated by the use of the following equation (7), followed by terminating the program:

$$gc = (1-EA) \times gt + (1-EB) \times gc \qquad (7)$$

where gc on the right side is a value calculated in the last loop.

According to the program of FIG. 4 described above, the EGR direct supply ratio EA and the EGR carry-off ratio are set to values which reflect the dead time in the travel of the recirculation gas (the time period between the time the recirculation gas passes the EGR valve and the time the gas reaches the combustion chamber) and the response time lag in the opening/closing action of the EGR valve, so that the actual gas amount gin drawn into the combustion chamber, obtained by applying the EA and EB values to the equation (5) accurately represents the recirculation gas amount drawn into the combustion chamber, which reflects dynamic characteristics of the recirculation gas, i.e. the influence of the dead time and the gas amount staying in the bulk chamber, etc., and dynamic characteristics of the EGR valve. Thus, the accurate basic fuel amount TIM reflecting the influence of the EGR gas recirculation can be obtained by multiplying the basic fuel amount TIM by the net EGR coefficient KEGRN by the use of the equation (4) (step S35 in FIG. 3). Therefore, the air-fuel ratio of the mixture to be supplied to the combustion chamber can be accurately controlled to a desired value.

FIG. 5 shows a program for calculating the basic ignition timing θMAP.

At a step S61, the basic ignition timing θMAP0 for EGR off is read from a θMAP map for EGR off, which is set in accordance with the engine rotational speed NE and the intake pipe absolute pressure PBA, in response to the sensed NE and PBA values, and at a step S62 the basic ignition timing θMAPT for EGR on is read from a θMAP map for EGR on, which is set like the θMAP map for EGR off, in response to the sensed NE and PBA values.

At the next step S63, the basic ignition timing θMAP is calculated by the use of the following equation (8):

$$\theta MAP = (\theta MAPT - \theta MAPO) \times (1-KEGRN)/(1-KEGR) + \theta MAPO \qquad (8)$$

Figure 8:
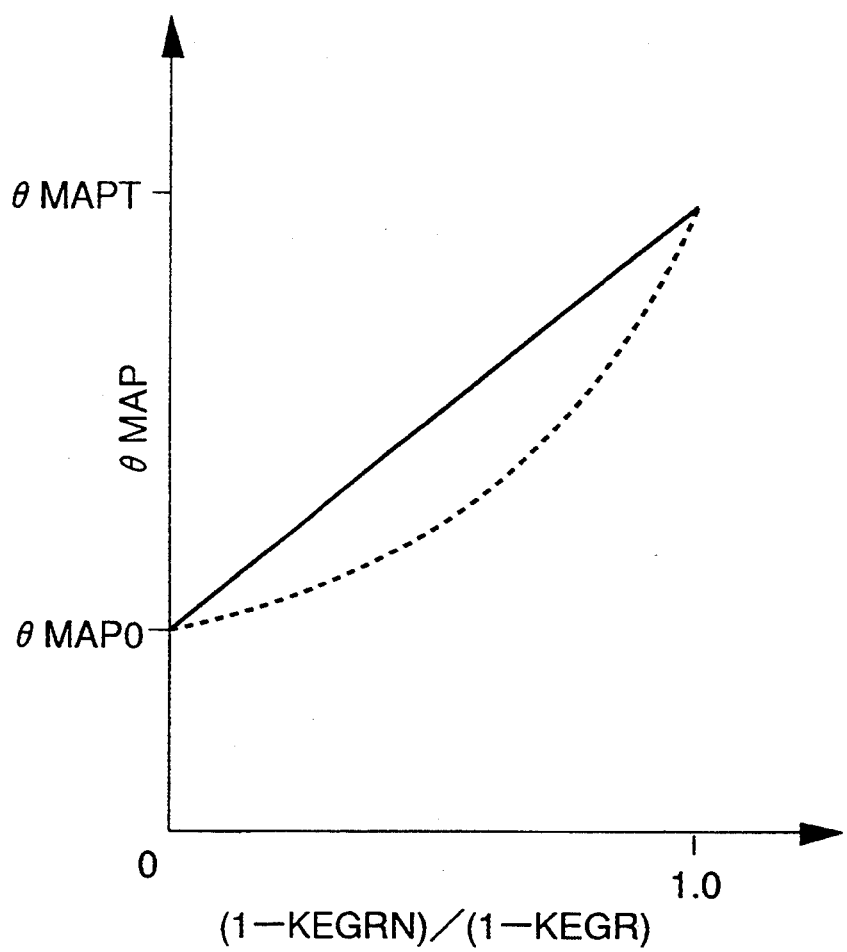
FIG. 8 shows a table showing the relationship between the basic ignition timing ($\theta$MAP) and the EGR coefficient (KEGR)

According to the equation (8), at EGR off, KEGRN = 1 holds (because gin=0 holds in the aforementioned equation (6)), and hence θMAP=θMAPO, whereas at EGR on, when KEGR=KEGRN holds, θMAP≠θMAPT, and when KEGR=KEGRN holds, θMAP is obtained by linearly interpolating the θMAPT value and the θMAPO value. This linear interpolation may be applied even in the case where the actual θMAP has a characteristic indicated by the broken line in FIG. 8 with respect to (1−KEGRN)/(1−KEGR), where the θMAP value is calculated to a practically appropriate value by means of the linear interpolation of the θMAP and θMAPO values. In this way, at EGR on, the basic ignition timing θMAP is determined by the use of the net EGR coefficient KEGRN calculated to a value reflecting dynamic characteristics of the EGR valve and those of the recirculation gas, and therefore the ignition timing can be accurately controlled to a desired value.

In the present embodiment, the valve opening command value LCMD for the EGR valve 22 is set to a value based upon the EGR coefficient KEGR, as hereinafter described.

According to the embodiment described above, since the recirculation gas amount is calculated based upon dynamic characteristics of the recirculation gas control valve and those of the recirculation gas as well as the engine rotational speed and load on the engine, and the fuel supply amount is corrected by the calculated recirculation gas amount, the air-fuel ratio of the mixture supplied to the combustion chamber can be properly controlled at the transition from EGR on to EGR off or vice versa as well as during EGR on, to thereby further improve exhaust emission characteristics and driveability of the engine.

Figure 9:
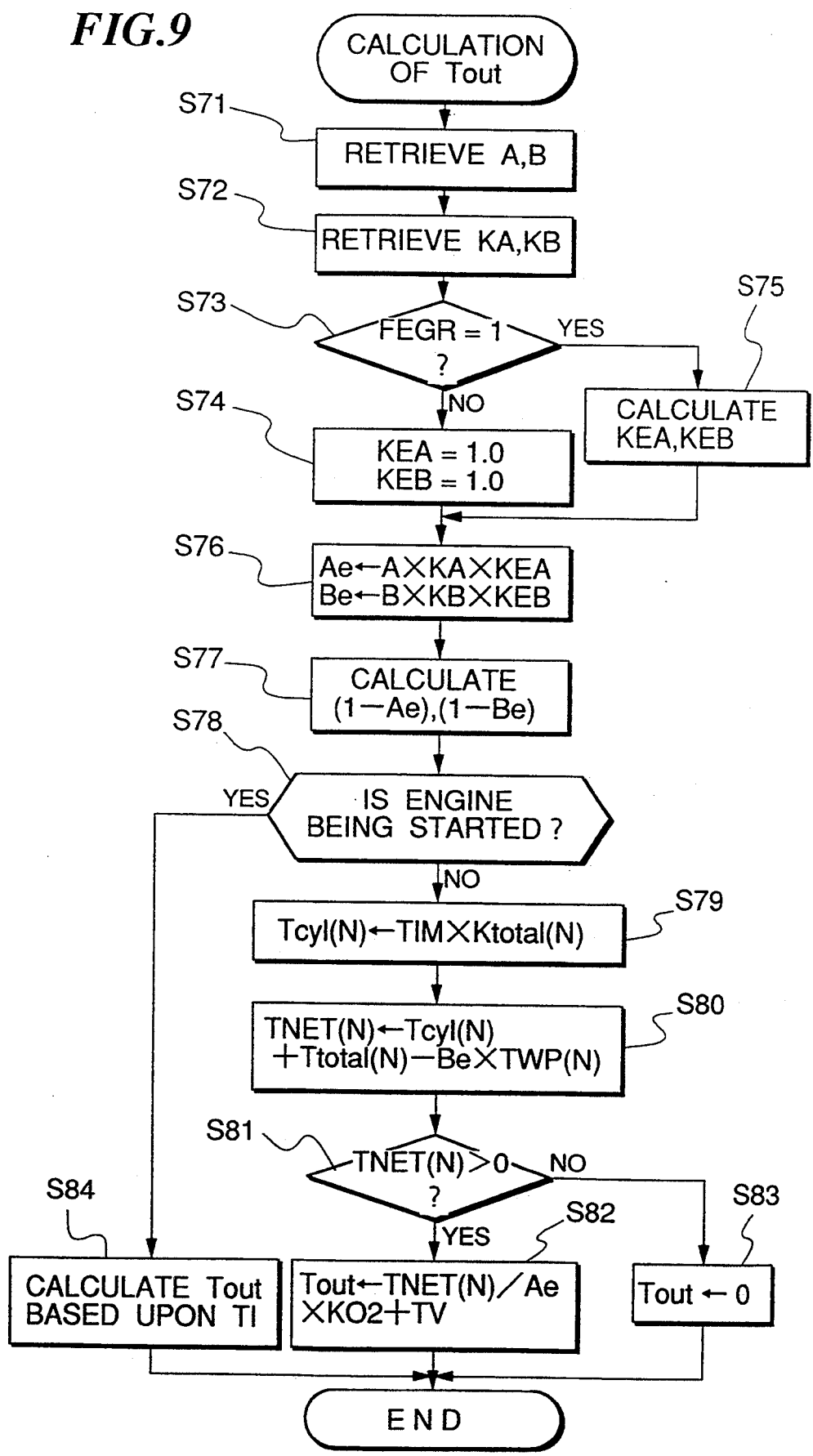
FIG. 9 is a flowchart of a program for calculating a fuel injection period (Tout) according to another embodiment of the invention.

FIG. 9 shows a program for calculating the fuel injection amount (fuel injection period) Tout, according to another embodiment of the invention. This program is executed upon generation of each TDC signal pulse and in synchronism therewith.

At a step S71, a direct supply ratio A and a carry-off ratio B of fuel are calculated. The direct supply ratio A is defined as a ratio of a fuel amount directly or immediately drawn into the combustion chamber in a cycle to the whole fuel amount injected in the same cycle, the direct supply ratio including a fuel amount carried off the inner surface of the intake pipe 2 by evaporation etc., in the same cycle. The carry-off ratio B is defined as a ratio of a fuel amount carried off the inner surface of the intake pipe 2 by evaporation etc. and drawn into the combustion chamber in the present cycle to the whole fuel amount which adhered to the inner surface of the intake pipe 2 in the last or immediately preceding cycle. The direct supply ratio A and the carry-off ratio B are read, respectively, from an A map and a B map set in accordance with coolant temperature TW and intake pipe absolute pressure PBA, in response to the detected TW and PBA values. The direct supply ratio A and the carry-off ratio B may be calculated by interpolation, if required.

Figure 11A:
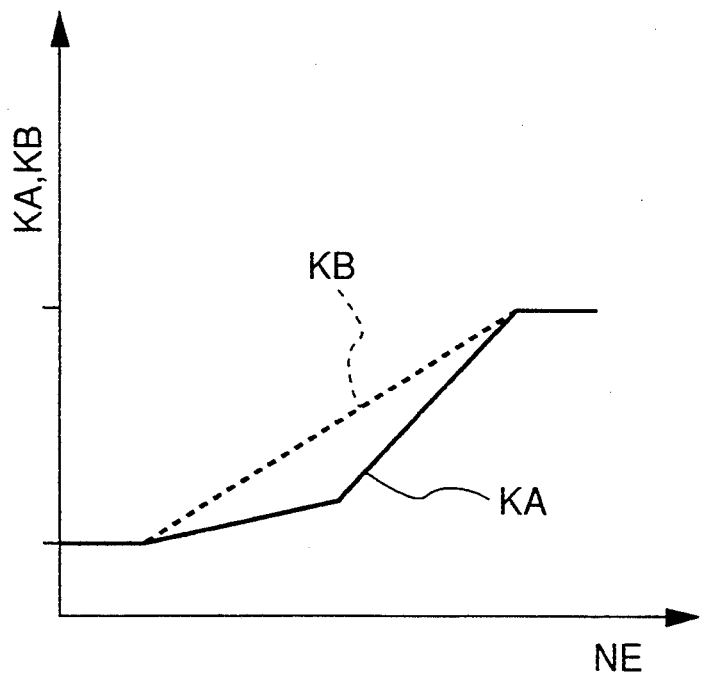
FIGS. 11(a) and (b) show tables for determining correction coefficients (KA, KB, KEA, KEB) for a direct supply ratio and a carry-off ratio.

At the next step S72, first correction coefficients KA and KB for correcting the direct supply ratio A and the carry-off ratio B, respectively, are calculated. The first correction coefficients KA and KB are set in accordance with the engine rotational speed NE, as shown in FIG. 11(a). That is, the first correction coefficients KA and KB are set to larger values as the engine rotational speed NE increases.

The reason why the first correction coefficients KA and KB are thus increased as the engine rotational speed NE increases is that the direct supply ratio A and the carry-off ratio B apparently increase as the intake air flow speed in the intake pipe increases with an increase in the engine rotational speed NE.

Next, at a step S73, it is determined whether or not the EGR flag FEGR assumes the value of 1. If the answer is affirmative (YES), i.e. the EGR value is open, second correction coefficients KEA and KEB for correcting the direct supply ratio A and the carry-off ratio B are calculated in response to the net EGR coefficient KEGRN calculated at the step S54 in FIG. 4, and then the program proceeds to a step S76. The second correction coefficients KEA and KEB are set in accordance with the (1−KEGRN) value, for instance, as shown in FIG. 11(b).

In the figure, the abscissa indicates the (1−KEGRN) value, which is equal to gin/TIM according to the aforementioned equation (6) and corresponds to the net recirculation ratio EGRR/RN (calculated to a value reflecting dynamic characteristics of the EGR valve 22 and those of the recirculation gas).

Figure 11B:
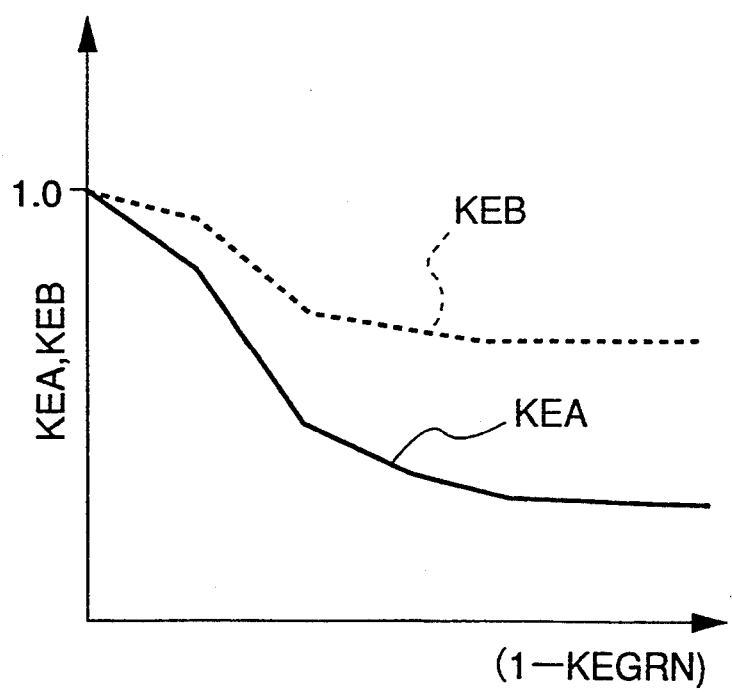

The reason why, as shown in FIG. 11(b), the KEA and KEB values are set to smaller values as the net recirculation ratio EGRR/RN becomes larger is that the heat flux (amount of thermal transfer per unit area) within the intake pipe becomes lower as the recirculation gas amount increases, making it more difficult for fuel within the intake pipe to be vaporized.

If the answer to the question of the step S73 is negative (NO), i.e. FEGR=0, which means that the EGR valve 22 is closed, the second correction coefficients KEA, KEB are both set to 1.0 at a step S74, and then the program proceeds to a step S76.

At the step S76, corrected values Ae and Be of the direct supply ratio and the carry-off ratio are calculated by the use of the following equations (9) and (10). Further, (1−Ae) and (1−Be) are calculated at a step S77, followed by the program proceeding to a step S78:

$$Ae = A \times KA \times KEA \qquad (9)$$

$$Be = B \times KB \times KEB \qquad (10)$$

where the values Ae, (1−Ae) and (1−Be) thus calculated are stored into the RAM of the ECU 5 for use in a program shown in FIG. 10, which will be described hereinafter.

At a step S78, it is determined whether or not the engine is being started. If the answer is affirmative (YES), the fuel injection amount Tout is calculated based upon a basic fuel amount TI for use at the start of the engine at step S84, and then the program is terminated. If the answer to the question of the step S78 is negative (NO), i.e., if the engine is not being started, a required fuel amount TCYL(N) for each cylinder, which does not include an additive correction term Ttotal, referred to hereinafter, is calculated by the use of the following equation (11), at a step S79:

$$Tcyl(N) = TIM \times Ktotal(N) \qquad (3)$$

where (N) represents a number allotted to the cylinder for which the required fuel amount Tcyl is calculated. TIM corresponds to TIM in the aforementioned equation (1) and represents a basic fuel amount to be applied when the engine is under normal operating conditions (other than the starting condition) and is calculated in response to the engine rotational speed NE and the intake pipe absolute pressure PBA. Ktotal(N) corresponds to the correction coefficients K1 in the aforementioned equation (1) and represents the product of all correction coefficients (e.g. a coolant temperature-dependent correction coefficient KTW and a leaning correction coefficient KLS) which are calculated based upon engine operating parameter signals from various sensors excluding an air-fuel ratio correction coefficient KO2 which is calculated based on an output signal from the O2 sensor 12.

At step S80, a combustion chamber supply fuel amount TNET, which should be supplied to the corresponding combustion chamber in the present injection cycle, is calculated by the use of the following equation (12):

$$TNET = Tcyl(N) + Ttotal - Be \times TWP(N) \qquad (12)$$

where Ttotal corresponds to the correction variables K2 in the aforementioned equation (1) and represents the sum of all additive correction terms (e.g. an acceleration fuel-increasing correction term TACC), which is calculated based on engine operating parameter signals from various sensors. The value Ttotal does not include an ineffective time correction term TV, referred to later. TWP(N) represents an intake pipeadherent fuel amount (estimated value), which is calculated by the program of FIG. 10. (Be×TWP(N)) corresponds to an amount of fuel, which is evaporated from fuel adhering to the inner surface of the intake pipe 2 and carried into the combustion chamber. A fuel amount corresponding to the fuel amount carried off the intake pipe inner surface need not be injected, and, therefore, is subtracted from the value Tcyl(N) in the equation (12).

At a step S81, it is determined whether or not the value TNET calculated by the equation (12) is larger than a value of 0. If the answer is negative (NO), i.e., if TNET≦0, the fuel injection amount Tout is set to 0, followed by terminating the program. If the answer at the step S81 is affirmative (YES), i.e., if TNET>0, the Tout value is calculated by the use of the following equation (13):

$$Tout = TNET(N)/Ae \times KO2 + TV \qquad (13)$$

where KO2 represents the aforementioned air fuel ratio correction coefficient calculated in response to the output from the O2 sensor 12. TV represents the ineffective time correction term.

Thus, a fuel amount corresponding to TNET(N)−×KO2+Be×TWP(N) is supplied to the combustion chamber by opening the fuel injection valve 6 over the time period Tout calculated by the equation (13).

Figure 10:
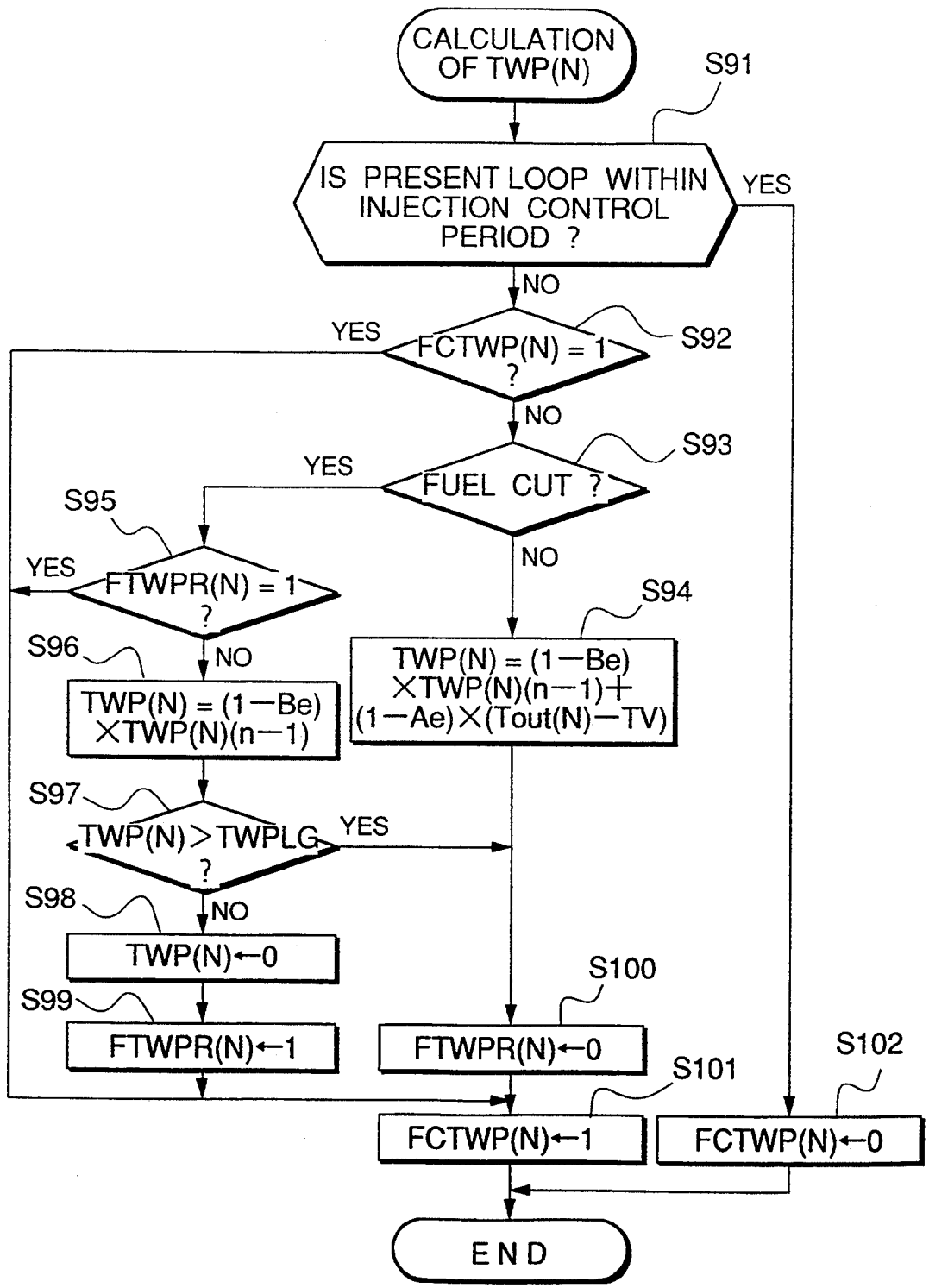
FIG. 10 is a flowchart of a program for calculating an intake pipe adherent fuel amount (TWP (N))

FIG. 10 shows the program for calculating the intake pipe-adherent fuel amount TWP(N), which is executed upon generation of each crank angle pulse which is generated whenever the crankshaft rotates through a predetermined angle (e.g. 30 degrees), and in synchronism therewith.

At a step S91, it is determined whether or not the present loop of execution of this program falls within a time period after the start of the calculation of the fuel injection amount Tout and before the fuel injection is completed (hereinafter referred to as the injection control period). If the answer is affirmative (YES), a first flag FCTWP(N) is set to a value of 0 at a step S92, followed by terminating the program. If the answer to the question of the step S91 is negative (NO), i.e., if the present loop is not within the injection control period, it is determined at a step S92 whether or not the first flag FCTWP(N) is equal to 1. If the answer is affirmative (YES), that is, if FCTWP(N)=1, the program jumps to a step S101, whereas if the answer is negative (NO), i.e., if FCTWP(N)=0, it is determined at a step S93 whether or not the engine is under fuel cut (the fuel supply is interrupted).

If the engine is not under fuel cut, the intake pipe-adherent fuel amount TWP(N) is calculated at a step S94 by the use of the following equation (14), then a second flag FTWPR(N) is set to a value of 0, and the first flag FCTWP(N) is set to a value of 1 at steps S100 and S101, followed by terminating the program:

$$TWP(N)=(1-Be) \times TWP(N)(n-1)+(1-Ae) \times (Tout(N)-TV) \qquad (14)$$

where TWP(N)(n−1) represents a value of TWP(N) obtained on the last occasion, and Tout(N) an updated or new value of the fuel injection amount Tout which has been calculated by the program of FIG. 9. The first term on the right side corresponds to a fuel amount remaining on the inner surface of the intake pipe 2 without being carried into the combustion chamber, out of the fuel previously adhering to the inner surface of the intake pipe 2, and the second term on the right side corresponds to a fuel amount newly adhering to the inner surface of the intake pipe 2 out of newly injected fuel.

If the answer to the question of the step S93 is affirmative (YES), i.e., if the engine is under fuel cut, it is determined at a step S95 whether or not the second flag FTWPR(N) has been set to a value of 1. If the answer is affirmative (YES), i.e., if FTWPR(N)=1, the program jumps to the step S101. If the answer is negative (NO), i.e., if FTWPR(N)=0, the adherent fuel amount TWP(N) is calculated by the use of the following equation (15) at a step S96, and then the program proceeds to a step S97:

$$TWP(N)=(1-Be) \times TWP(N)(n-1) \qquad (15)$$

The equation (15) is identical with the equation (14), except that the second term on the right side is omitted. The reason for the omission is that there is no fuel newly adhering to the intake pipe inner surface, due to fuel cut.

At the step S97, it is determined whether or not the calculated TWP(N) value is larger than a very small predetermined value TWPLG. If the answer is affirmative (YES), i.e., if TWP(N)>TWPLG, the program proceeds to the next step S100. If the answer to the question of the step S97 is negative (NO), i.e., if TWP(N)≦TWPLG, the TWP(N) value is set to a value of 0 at a step S98, and then the second flag FTWPR(N) is set to a value of 1 at a step S99, followed by the program proceeding to the step S101.

According to the program of FIG. 10 described above, the intake pipe-adherent fuel amount TWP(N) can be accurately calculated. Moreover, by using the calculated TWP(N) value for the calculation of the fuel injection amount Tout by the FIG. 9 program, an appropriate fuel amount can be supplied to the combustion chamber of each cylinder, which reflects the fuel amount adhering to the inner surface of the intake pipe 2 as well as the fuel amount carried off the adherent amount.

Further, according to the present embodiment, the direct supply ratio A and carry-off ratio B are corrected by the second correction coefficients KEA and KEB which depend upon the net recirculation ratio EGRR/RN (=1−KEGRN). Therefore, the calculated fuel injection amount reflects the recirculation gas amount. As a result, the air-fuel ratio of the mixture supplied to the combustion chamber of each cylinder can accurately controlled to a desired value.

Further, according to the present embodiment, since the correction coefficients KEA, KEB are calculated based upon the net recirculation ratio EGRR/RN determined in consideration of dynamic characteristics of the EGR valve and those of the recirculation gas, the fuel injection amount can be corrected so as to compensate for the response time lag of the EGR valve and the influence of recirculation gas staying in the recirculation passageway at a portion between the EGR valve and the combustion chamber, thereby making it possible to achieve more accurate air-fuel ratio control.

Although in the present embodiment, the second correction coefficients KEA, KEB for correcting the direct supply ratio A and the carry-off ratio B are calculated based upon the net recirculation ratio EGRR/RN, they may be determined based upon the recirculation ratio EGRR/RN (=1−KEGR, where KEGR represents the EGR coefficient calculated at the step S32 in FIG. 3), or either the value opening command valve LCMD of the EGR valve 22 or the actual valve opening LACT detected by the lift sensor 23. Further alternatively, a flowmeter may be provided in the exhaust recirculation passage 27 and the second correction coefficients KEA, KEB may be calculated in response to the output value from the flowmeter. In short, the correction coefficients KEA, KEB may be determined based upon a parameter or parameters which are indicative of the actual recirculation gas amount or estimate same, also enabling to calculate the fuel injection amount to a value reflecting the influence of the recirculation gas amount and hence achieve accurate air-fuel ratio control. In the embodiment described above, however, the correction coefficients KEA, KEB are calculated in a manner reflecting dynamic characteristics of the EGR valve and those of the recirculation gas, which makes it possible to accurately control the air-fuel ratio even in a transient state from EGR on to EGR off or vice versa.

According to the embodiment described above, the intake pipe-adherent fuel amount and the carried off fuel amount are corrected in response to the calculated recirculation gas amount. Therefore, the resulting calculated fuel injection amount can reflect the intake pipe-adherent fuel amount even during exhaust gas recirculation, to thereby enable accurately controlling the air-fuel ratio of the mixture supplied to the combustion chamber of each cylinder to a desired value. As a result, exhaust emission characteristics of the engine and driveability can be improved.

Figure 12:
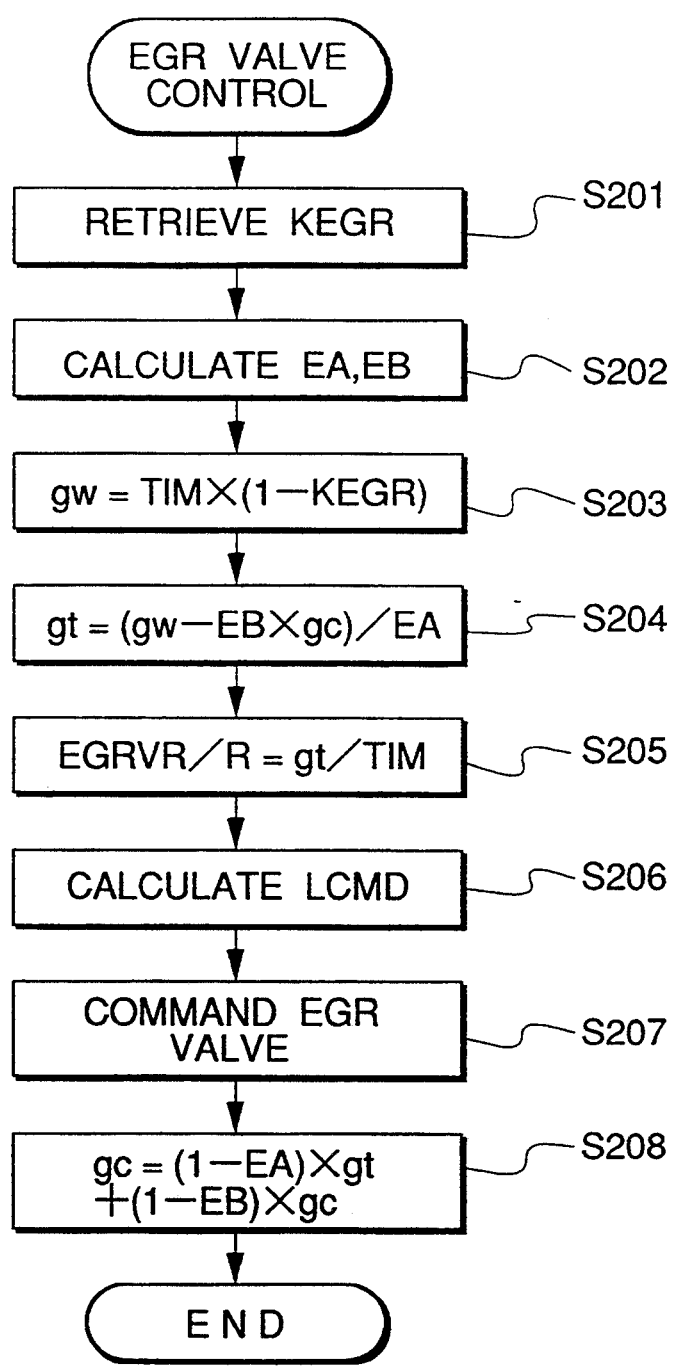
FIG. 12 is a flowchart of a program for calculating the valve opening of the exhaust gas recirculation valve.

FIG. 12 shows a program for controlling the valve opening of the EGR valve 22 according to an embodiment of the invention.

At a step S201, the EGR coefficient KEGR is calculated in response to the engine rotational speed NE and the intake pipe absolute pressure PBA, similarly to the step S32 in FIG. 3, referred to hereinbefore. At the next step S202, similarly to at the aforementioned steps S41 to S51 in FIG. 4, the EGR direct supply ratio EA and the EGR carry-off ratio EB are calculated in response to the NE and PBA values detected τTDC before.

Next, at a step S203, the recirculation gas amount (supply recirculation gas amount) gw to be supplied to the combustion chamber is calculated by the use of the following equation (16):

$$gw=TIM \times (1-KEGR) \qquad (16)$$

Then, at a step S204, the recirculation gas amount (passing recirculation gas amount) gt which should pass the EGR valve 22 is calculated by the use of the following equation (17):

$$gt=(gw-EB \times gc)/EA \qquad (17)$$

where gc represents a staying recirculation gas amount (the amount of the recirculation gas staying in the recirculation passageway between the EGR valve and the combustion chamber), which was calculated in the last loop at a step S208, referred to hereinafter. The equation (17) corresponds to a transformation of the equation (5) obtained by moving gt to the left side and replacing gin by gw. Accordingly, the gt value obtained by the use of the equation (17) represents the passing recirculation gas amount which reflects dynamic characteristics of the EGR valve 22 and those of the recirculation gas. Therefore, if the EGR valve 22 is controlled to pass the recirculation gas by an amount corresponding to the gt value, the desired supply recirculation gas amount gw can be obtained.

At the next step S205, a passing recirculation ratio EGRVR/R, which is a recirculation ratio based upon the passing recirculation gas amount gt passing the EGR valve, is calculated by the use of the following equation (18). Incidentally, the recirculation ratio of the recirculation gas to the combustion chamber EGRR/R is expressed as gw/TIM (=1−KEGR):

$$ti\ EGRVR/R = gt/TIM \quad (18)$$

At the next step S206, the valve opening command value LCMD of the EGR valve 22 is determined in response to the passing recirculation ratio EGRVR/R calculated above, as well as the engine rotational speed NE and the intake pipe absolute pressure PBA. This calculation is carried out by the use of LCMD maps, one of which is shown, e.g. in FIG. 13.

Figure 13:
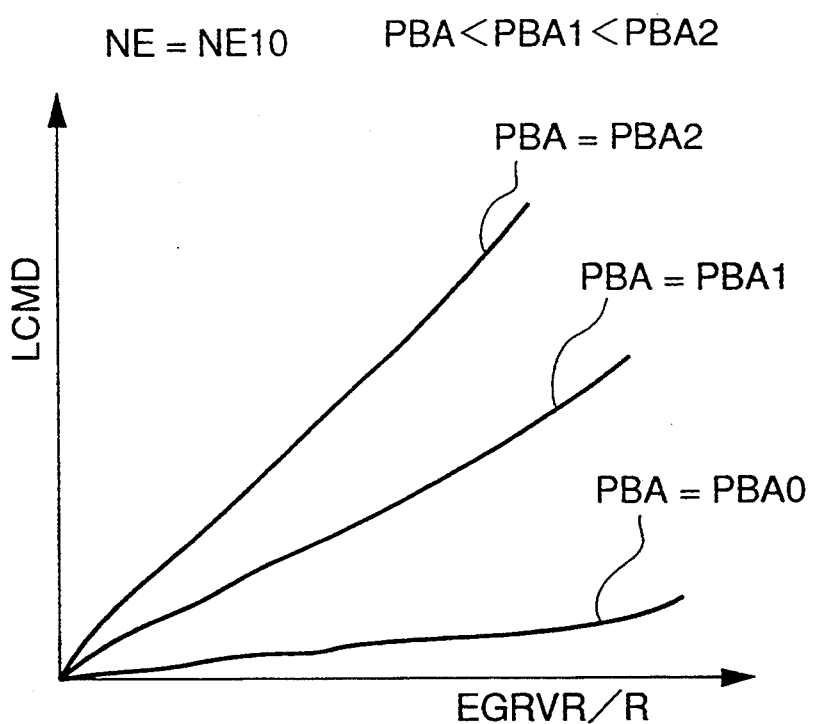
FIG. 13 shows a table for determining a valve opening command value (LCMD) for the exhaust gas recirculation valve.

In the example of FIG. 13, the LCMD map is set for use when the engine rotational speed NE assumes a predetermined value NE 10 (e.g. 1000 rpm), and wherein three predetermined PBA curves PBA0, PBA1 and PBA2 are provided. A LCMD value is read from the LCMD map in response to the EGRVR/R value and the sensed NE and PBA values. Similar LCMD maps are further provided for use when the engine rotational speed NE assumes other predetermined values (e.g. 2000, 2500, and 3000 rpm), respectively.

Then, at a step S207, the valve opening command value LCMD obtained as above is outputted, and at the next step S208, the staying recirculation gas amount gc is calculated by the aforementioned equation (7), similarly to the step S55 in FIG. 4, followed by terminating the program.

According to the present embodiment, since the valve opening of the EGR valve 22 is controlled by taking into consideration dynamic characteristics of the EGR valve and those of the recirculation gas such that the desired recirculation ratio EGRR/R (=gw/TIM =1−KEGR) can be obtained, the net EGR coefficient KEGRN need not be calculated in calculating the fuel injection amount and the ignition timing, as distinct from the aforementioned embodiments. Therefore, the desired air-fuel ratio and the ignition timing can be attained by the basic fuel amount TIM and the basic ignition timing θMAP calculated by the use of the EGR coefficient KEGR.

According to the embodiment described above, since the control amount of the recirculation control valve is calculated based upon dynamic characteristics of the recirculation gas control valve and those of the recirculation gas as well as the rotational speed and load on the engine, the recirculation gas amount actually drawn into the combustion chamber of the engine can be accurately controlled, to thereby further improve the exhaust emission characteristics and driveability of the engine.

What is claimed is:

1. In a control system for an internal combustion engine having an intake passage having an inner surface, an exhaust passage, at least one combustion chamber, and exhaust recirculation means having an exhaust gas recirculation control valve for controlling recirculation of exhaust gases from said exhaust passage to said intake passage, said control system including supply fuel amount calculating means for calculating an amount of supply fuel to be supplied to said engine, based upon operating conditions of said engine, adherent fuel amount estimating means for estimating an amount of adherent fuel adhering to said inner surface of said intake passage, carried-off fuel amount estimating means for estimating an amount of carried-off fuel evaporated from fuel adhering to said inner surface of said intake passage and carried into said combustion chamber, supply fuel amount correction means for correcting said supply fuel amount calculated by said supply fuel amount calculating means, in response to said adherent fuel amount estimated by said adherent fuel amount estimating means and the carried off fuel amount estimated by said carried-off fuel amount estimating means, fuel supply means for supplying said supply fuel amount corrected by said supply fuel amount correcting means into said intake passage, and recirculation gas amount control means for controlling an amount of said exhaust gases to be recirculated from said exhaust passage to said intake passage, by controlling said exhaust gas recirculation control valve, based upon operating conditions of said engine, the improvement comprising:
recirculation gas amount calculating means for calculating said amount of said exhaust gases to be recirculated; and
estimated fuel amount correcting means for correcting said adherent fuel amount and said carriedoff fuel amount, based upon said amount of said exhaust gases calculated by said recirculation gas amount calculating means.

2. A control system as claimed in claim 1, wherein said recirculation gas amount calculating means calculates said amount of said exhaust gases to be recirculated, based upon dynamic characteristics of said exhaust gas recirculation control valve and those of exhaust gases being recirculated, and rotational speed and load condition of said engine.

3. In a control system for an internal combustion engine having an intake passage, an exhaust passage, at least one combustion chamber, and exhaust recirculation means having an exhaust gas recirculating passage extending between said exhaust passage and said intake passage, and an exhaust gas recirculation control valve for controlling recirculation of said exhaust gases from said exhaust passage to said intake passage through said exhaust gas recirculation passage, said 10 control system including fuel amount calculating means for calculating an amount of supply fuel to be supplied to said engine, based upon operating conditions of said engine, and recirculation gas amount control means for controlling an amount of said exhaust gases to be recirculated from said exhaust passage to said intake passage, by controlling said exhaust gas recirculation control valve, based upon said operating conditions of said engine, the improvement comprising:

recirculation gas amount calculating means for calculating said amount of said exhaust gases to be recirculated, based upon dynamic characteristics of said exhaust gas recirculation control valve and those of exhaust gases being recirculated, and operating parameters of said engine; and fuel amount correcting means for correcting said supply fuel amount, based upon said amount of said exhaust gases calculated by said recirculation gas amount calculating means.

4. A control system as claimed in claim 3, wherein said dynamic characteristics of said exhaust gas recirculation control valve include a response time lag of said valve in opening/closing action thereof.

5. A control system as claimed in claim 3, wherein said dynamic characteristics of said exhaust gases being recirculated include a time period between the time said exhaust gases being recirculated pass said exhaust gas recirculation control valve and the time the gases reach said combustion chamber, and an amount of exhaust gases staying in a passageway including said exhaust gas recirculation passage and said intake passage at a zone between said exhaust gas recirculation control valve and said combustion chamber.

6. A control system as claimed in claim 3, wherein said operating parameters of said engine comprises rotational speed and load conditions of said engine.

7. A control system as claimed in claim 3, wherein said recirculation gas amount calculating means calculates said amount of said exhaust gases, based upon a ratio of an amount of exhaust gases drawn into said combustion chamber in a cycle to said whole amount of exhaust gases which has passed said exhaust recirculation gas control valve in the same cycle, and a ratio of an amount of exhaust gases staying in a portion of said exhaust gas recirculation passage and said intake passage at a zone between said exhaust gas recirculation control valve and said combustion chamber in a preceding cycle and drawn into said combustion chamber in a present cycle to the whole amount of exhaust gases which stayed in said portion of said exhaust gas recirculation passage and said intake passage in a preceding cycle.

8. A control system for an internal combustion engine having an intake passage, an exhaust passage, at least one combustion chamber, and exhaust recirculation means having an exhaust gas recirculation control valve for controlling recirculation of exhaust gases from said exhaust passage to said intake passage, said control system including recirculation gas amount control means for controlling an amount of said exhaust gases to be recirculated from said exhaust passage to said intake passage by controlling said exhaust gas recirculation control valve based upon operating conditions of said engine, the improvement wherein:
said recirculation gas amount control means controls a control amount by which said exhaust gas recirculation control valve is to be controlled based upon dynamic characteristics of said exhaust gas recirculation control valve, dynamic characteristics of exhaust gases being recirculated, and operating parameters of said engine, and
wherein said dynamic characteristics of said exhaust gas recirculation control valve include a response time lag of said valve in opening/closing action thereof.

9. A control system as claimed in claim 8, wherein said operating parameters of said engine comprises rotational speed and load conditions of said engine.

10. A control system for an internal combustion engine having an intake passage, an exhaust passage, at least one combustion chamber, and exhaust recirculation means having an exhaust gas recirculation control valve for controlling recirculation of exhaust gases from said exhaust passage to said intake passage, said control system including recirculation gas amount control means for controlling an amount of exhaust gases to be recirculated from said exhaust passage to said intake passage by controlling said exhaust gas recirculation control valve based upon operating conditions of said engine, the improvement wherein:
said recirculation gas amount control means controls a control amount by which said exhaust gas recirculation control valve is to be controlled based upon dynamic characteristics of said exhaust gas recirculation control valve, dynamic characteristics of the exhaust gases being recirculated, and operating parameters of said engine, and
wherein said dynamic characteristics of said exhaust gases being recirculated include a time period between the time said exhaust gases being recirculated pass said exhaust gas recirculation control valve and the time the gases reach said combustion chamber, and an amount of exhaust gases staying in a passageway including said exhaust gas recirculation passage and said intake passage at a zone between said exhaust gas recirculation control valve and said combustion chamber.

11. In a control system for an internal combustion engine having an intake passage, an exhaust passage, at least one combustion chamber, and exhaust recirculation means having an exhaust gas recirculation control valve for controlling recirculation of exhaust gases from said exhaust passage to said intake passage, said control system including ignition timing calculating means for calculating ignition timing of said engine, based upon operating conditions of said engine, and recirculation gas amount control means for controlling an amount of said exhaust gases to be recirculated from said exhaust passage to said intake passage, by controlling said exhaust gas recirculation control valve, based upon said operating conditions of said engine, the improvement comprising:
recirculation gas amount calculating means for calculating said amount of said exhaust gases to be recirculated, based upon dynamic characteristics of said exhaust gas recirculation control valve and those of exhaust gases being recirculated, and operating parameters of said engine; and
ignition timing correcting means for correcting said ignition timing, based upon said amount of said exhaust gases calculated by said recirculation gas amount calculating means.

12. A control system as claimed in claim 11, wherein said dynamic characteristics of said exhaust gas recirculation control valve include a response time lag of said valve in opening/closing action said thereof.

13. A control system as claimed in claim 11 wherein said dynamic characteristics of said exhaust gases being recirculated include a time period between said time said exhaust gases being recirculated pass said exhaust gas recirculation control valve and the time the gases reach said combustion chamber, and an amount of exhaust gases staying in a passageway including said exhaust gas recirculation passage and said intake passage at a zone between said exhaust gas recirculation control valve and said combustion chamber.

14. A control system as claimed in claim 11, wherein said recirculation gas amount calculating means calculates said amount of said exhaust gases, based upon a ratio of an amount of exhaust gases drawn into said combustion chamber in a cycle to the whole amount of exhaust gases which has passed said exhaust recirculation gas control valve in the same cycle, and a ratio of an amount of exhaust gases staying in a portion of said exhaust gas recirculation passage and said intake passage at a zone between said exhaust gas recirculation control valve and said combustion chamber in a preceding cycle and drawn into said combustion chamber in a present cycle to the whole amount of exhaust gases which stayed in said portion of said exhaust gas recirculation passage and said intake passage in a preceding cycle.

15. A control system as claimed in claim 11, wherein said operating parameters of said engine comprises rotational speed and load conditions of said engine.

* * * * *